United States Patent [19]

Colman

[11] Patent Number: 4,553,013
[45] Date of Patent: Nov. 12, 1985

[54] GAS SEAL FOR MIG GUN SYSTEMS

[75] Inventor: William H. Colman, Cape Girardeau County, Mo.

[73] Assignee: Lenco, Inc., Jackson, Mo.

[21] Appl. No.: 639,003

[22] Filed: Aug. 8, 1984

[51] Int. Cl.[4] .............................................. B23K 9/16
[52] U.S. Cl. ................................ 219/74; 219/137.44; 219/137.63
[58] Field of Search ..................... 219/137.31, 137.44, 219/137.63, 137.9, 74

[56] References Cited

U.S. PATENT DOCUMENTS 3,544,758 12/1970 dal Molin ....................... 219/137.63
3,783,233 1/1974 dal Molin ................... 219/137.63 X Primary Examiner—Roy N. Envall, Jr.
Assistant Examiner—Alfred S. Keve
Attorney, Agent, or Firm—Haverstock, Garrett & Roberts

[57] ABSTRACT

A gas seal for a MIG gun system for preventing the leakage of shielding gas out the rear end thereof which includes a connector assembly, which seal is embodied in an elongated tubular member which has an outside diameter sized to be positioned extending into a bore extending through the connector assembly of the MIG gun welding system. The tubular member has flange means on one end including an outwardly extending annular flange which has a surface adapted when installed to be in surface-to-surface contact with the connector assembly adjacent the bore therethrough to form a seal therebetween, and an inwardly extending flange defining an opening of a size to permit welding wire to move therethrough. The inwardly extending flange and the adjacent portion of the tubular member form a cavity on the upstream side of the inwardly extending flange. A resilient member is positioned in the cavity upstream of the opening defined by the inwardly extending flange. The resilient member has an opening therethrough in position to register with the opening defined by the inwardly extending flange, which opening is sized to resiliently engage the welding wire when the welding wire is positioned extending therethrough. The invention also resides in provision to lock the tubular member in position in the adapter bore.

17 Claims, 5 Drawing Figures

4,553,013

GAS SEAL FOR MIG GUN SYSTEMS

BACKGROUND OF THE INVENTION

1. Field of the Invention

The present invention relates to a device for substantially reducing or preventing leakage of shielding gas in an arc welding gun, and especially a gas-metal arc welding (GMAW) gun, sometimes known as a metal inert gas (MIG) welding gun, supplied with a consumable welding electrode, a supply of shielding gas and electrical power supplied through a supply cable from a welding machine.

2. Description of the Prior Art

It is known in the art to use a welding gun which controllably feeds a consumable welding electrode in the form of a thin welding wire to a welding location. It is also known in the art to surround the welding location with a shielding gas to prevent extraction of contaminants, such as oxygen and nitrogen, from the ambient air. The shielding gas is usually an inert gas such as helium, argon or carbon dioxide and is continuously supplied during welding to form a shield or curtain around the tip of the electrode at the welding location.

The welding gun assembly comprises a welding gun nozzle mounted on the end of a gun tube, a connector assembly and a flexible cable assembly extending between the gun tube and the connector assembly for communication therebetween. The connector assembly has means associated therewith for connection to a power adapter which in turn is connected to a source of welding wire. The connector assembly also has a connection to a source of inert gas and a source of electric power for the welding operation. Electric power is also provided by way of the connector assembly for controlling the feeding of the welding wire, the inert gas and the electric power. The cable assembly includes a tubular wall portion having an electrically conductive portion, a passageway extending therethrough and means extending through the passageway in the cable assembly through which the welding wire passes as it moves from the connector assembly to the welding gun tube. The means extending through the passageway through which the welding wire passes includes a flexible liner having a first end extending to adjacent the welding gun tube and an opposite end extending into a bore formed in the connector assembly.

An undesirable condition of known MIG gun type welding systems is the leakage of shielding gas especially out the rear end thereof where the welding wire enters. When carbon dioxide is being used as the shielding gas, some leakage may be more tolerable because of the relatively low cost of this gas. However, when gases such as argon or helium are being used as the shielding gas, leakage becomes of much greater concern due to the relatively high cost of these gases.

Prior art attempts to reduce the amount of shielding gas leakage have resulted in constructions that are somewhat effective but still result in considerable loss of shielding gas. One such device includes a tubular member which is open from one end to receive a relatively non-resilient felt-like member with a hole therethrough for the welding electrode to pass through. The opposite end of the tubular member includes an inwardly extending portion through which a small central opening is formed for the welding wire to pass through. The same end of the device has a radially extending annular flange which is formed with a radially extending surface or shoulder that abuts the surface of the structure in which the member is positioned. The device is mounted with the flexible liner extending partially into the tubular member from the fully open end thereof and against the felt-like member which is downstream of where the welding electrode enters the opening formed in the inwardly extending portion. The known device is positioned extending into a bore in the connector assembly with the radial flange portion abutting the outer surface of the connector assembly. This construction reduces to some extent the leakage of the shielding gas where the welding electrode passes through the felt-like member but this savings is minimal mainly because the felt-like member is positioned downstream of where the wire electrode enters the opening formed in the inwardly extending portion, and the felt-like member being non-resilient and relatively loosely positioned in the tubular member allows some gas leakage to take place around and through the felt-like member and out the opening in the brass member through which the welding wire passes as well as between the tubular member and the connector assembly in which it is supported. Leakage can also occur because the radial flange portion may not form an effective seal between the tubular member and the connector assembly. Other devices comprising similar liner support means have also included seal devices for reducing the leakage of shielding gas from the area between the tubular member and the connector assembly. Such devices have included the use of "O" rings at the end of the liner between the tubular member and the support structure and some have included seals positioned around the outside diameter of the flexible liner to reduce the amount of shielding gas that surrounds the liner and leaks out the rear end thereof. Bear in mind also that the shielding gas in most systems, including the present system, enters near the rear of the system and traverses the length of the system to reach the welding area. Therefore, any possible leakage that can occur near the rear of the system will have a greater adverse effect because it is working against the back pressure of the system. Also the higher the pressure of the shielding gas the greater will be the leakage that occurs.

SUMMARY OF THE INVENTION

The present invention teaches the construction of improved and more effective gas seal means for the rear end of a MIG type gun including positioning a resilient wire engaging member supported on the upstream side of a small orifice through which the welding wire passes as it enters the flexible liner as distinguished from known devices that include means located downstream of such orifice as discussed above. In this way gas leakage is substantially reduced or prevented altogether through the space defined in and around the flexible liner at the rear end thereof and through and around the area where a consumable welding electrode enters the flexible liner. More particularly, the present invention resides in providing first means which seal between the liner and the connector assembly at the rear end thereof where it abuts the surface of the connector assembly to prevent leakage of shielding gas therebetween and second means which effectively seal around the wire electrode itself at the location upsteam of where it enters the liner to greatly reduce or prevent shielding gas in the flexible liner from escaping through and around the area where the welding electrode enters the liner. The provision of such first and second sealing means substantially reduces or prevents shielding gas from escaping and being wasted.

It is therefore a principal object of the present invention to provide means for substantially reducing or eliminating the leakage of shielding gas from metal inert gas welding systems.

Another object is to reduce the cost of welding where a shielding gas is used to surround the welding location.

Another object is to reduce the amount of inert gas consumed in metal inert gas welding systems.

It is another object to reduce the cost of welding with metal inert gas (MIG) welding systems.

Another object is to provide relatively inexpensive means for substantially reducing the leakage of shielding gas from metal inert gas welding systems.

Another object is to make it cheaper to weld with all types of shielding gases.

A further object of the invention is to provide means for significantly reducing the leakage of shielding gas through and around the area where a consumable welding electrode enters a monocoil liner.

Another object is to provide means for sealing against shielding gas leakage which is simple to make and easy to install.

Still another object is to provide means for sealing against shielding gas leakage that can be made to be used with different diameter welding wire.

These and other objects and advantages of the present invention will become apparent to those familiar with the art after considering the following detailed specification of a preferred embodiment in conjunction with the accompanying drawings.

Figure 1:
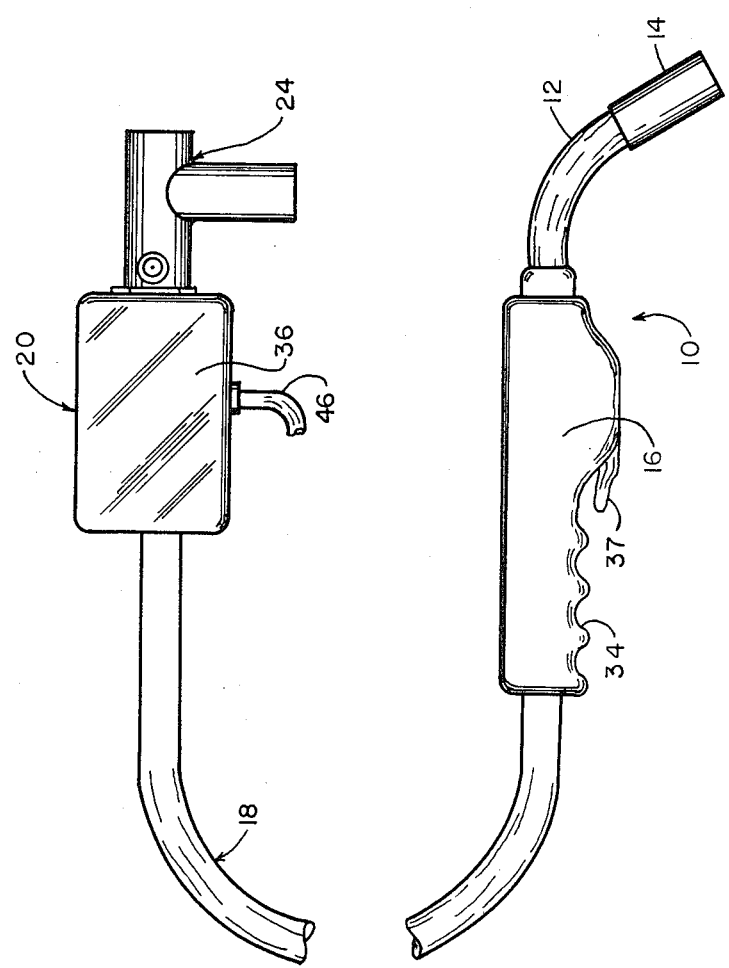
FIG. 1 is a side elevational view of a welding gun assembly having means to reduce gas leakage associated therewith constructed according to the teachings of the present invention.
Figure 4:
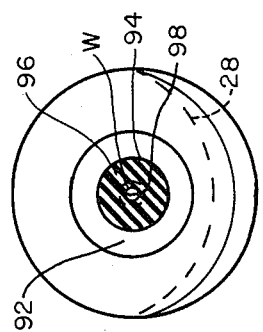
FIG. 4 is an enlarged fragmentary side elevational view of the connector assembly and power adapter.
Figure 5:
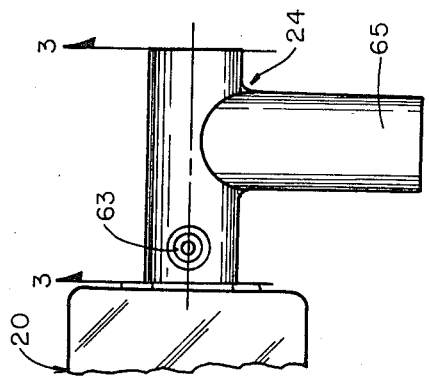
FIG. 5 is an enlarged right end view of the means for connection to the power adapter shown in FIG. 2.

Referring to the drawings more particularly by reference numbers, number 10 refers to a welding gun assembly having means associated therewith to reduce or eliminate gas leakage constructed according to the present invention. The construction and operation of the welding gun assembly 10 may be conventional such as shown in Colman U.S. Pat. No. 4,403,136, assigned to applicant's assignee.

The gun assembly 10 includes a gun tube 12, a welding gun nozzle 14, an operator held handle portion 16, an elongated cable assembly 18, a connector assembly 20 having a quick connect/disconnect coupling member 22 (FIG. 2) attached thereto, and a power adapter 24. The power adapter 24 has a connection to a wire feed unit (not shown) as by threaded bore 26 (FIG. 3). The power adapter 24 will be supplied with welding wire "W" fed thereto from a spool or other form of supply of welding wire which welding wire is fed to and through the connector assembly 20, the cable assembly 18, the handle portion 16, and to and through the gun tube 12 to the location where welding is to take place.

The quick connect/disconnect coupling 22 has a recessed cam surface 28 formed thereon at the location shown in position to cooperate with a detent 30 formed on inner bore surface 32 of the power adapter 24. When the coupling 22 is inserted into the power adapter 24, as shown in FIG. 3, the detent 30 is aligned with the cam surface 28 and by rotating the connector 20 in the power adapter 24 the detent 30 wedges against the cam surface 28, to lock the members together. However, the connector 20 can be loosened for removal from the power adapter 24 by turning in the reverse direction.

The handle portion 16 has a finger grip portion 34 and a movable trigger mechanism 37 which the operator uses to control the system.

The connector assembly 20 includes a housing 36 which has a bore 38 formed in the inlet side thereof for receiving one end of the quick connect/disconnect coupling member 22, an aligned bore 40 in the opposite side of the housing 36 into which one end of the cable assembly 18 is positioned, and another bore 42 for receiving a fitting 44 for connection to one end of an electric conduit 46 containing the electric leads 48 and 50 which are connected by suitable leads that extend through the cable 18 for connection to switch means (not shown) located in the handle portion 16. The switch means are under control of the trigger mechanism 37 which when depressed controls the system 10 to cause the feeding of welding wire from the welding wire source (not shown), the supply of gas to the welding location and the supply of electric welding energy to the device.

The quick connect/disconnect coupling 22, which is constructed of a material such as brass, has an axial bore 52 that extends through the length thereof, and the outer surface of the connect/disconnect coupling member 22 is shown having a pair of spaced outside grooves 54 and 56 for receiving respective "O" rings 58 and 60. In the space between the "O" ring grooves 54 and 56 is an annular outside groove 62 which communicates with one or more radially extending orifices 64 which also communicate with the axial bore 52. The coupling member 22 is movable into the bore 32 in the power adapter 24 and in so doing the bore 32 sealably engages the "O" rings 58 and 60 to form seals therebetween to prevent leakage from the groove 62 when shielding gas is being introduced. The power adapter 24 when locked in position as described is connected at socket 63 by suitable conduit means, the opposite end of which is connected to a source of shielding gas which is fed to the gun tube 12 by way of the radially extending orifices 64, the bore 52 in the coupling member 22 and through the cable 18 as will be described. Electric energy for the subject welding gun assembly 10 is supplied to power adapter 24 from an electric cable (not shown) which extends into the counterbore 67 in the power adapter 24, and which may have one or more threaded means such as threaded member 69 to bear against and lock the electric cable in position. This main source of welding power is fed from the power adapter 24 through the coupling 22 to a woven metal conductor 68 in the cable 18. Power adapter 24 is also connected to a source of welding wire. The shielding gas and welding wire also pass through the cable assembly 18, the handle portion 16, and the gun tube 12 and out from the free end of the nozzle 14 to the area where welding is taking place. The form of the connection to the source of shielding gas and to the main supply electric cable are necessary to the operation but are not at the heart of the invention.

Figure 2:
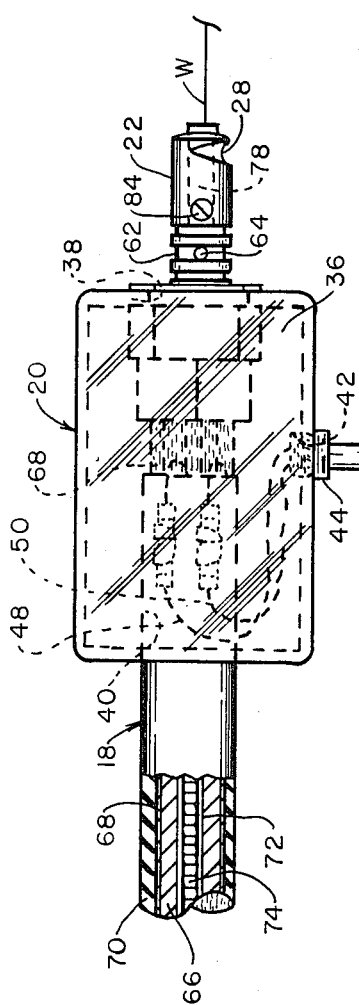
FIG. 2 is an enlarged side elevational view of the connector assembly FIG. 1.
Figure 3:
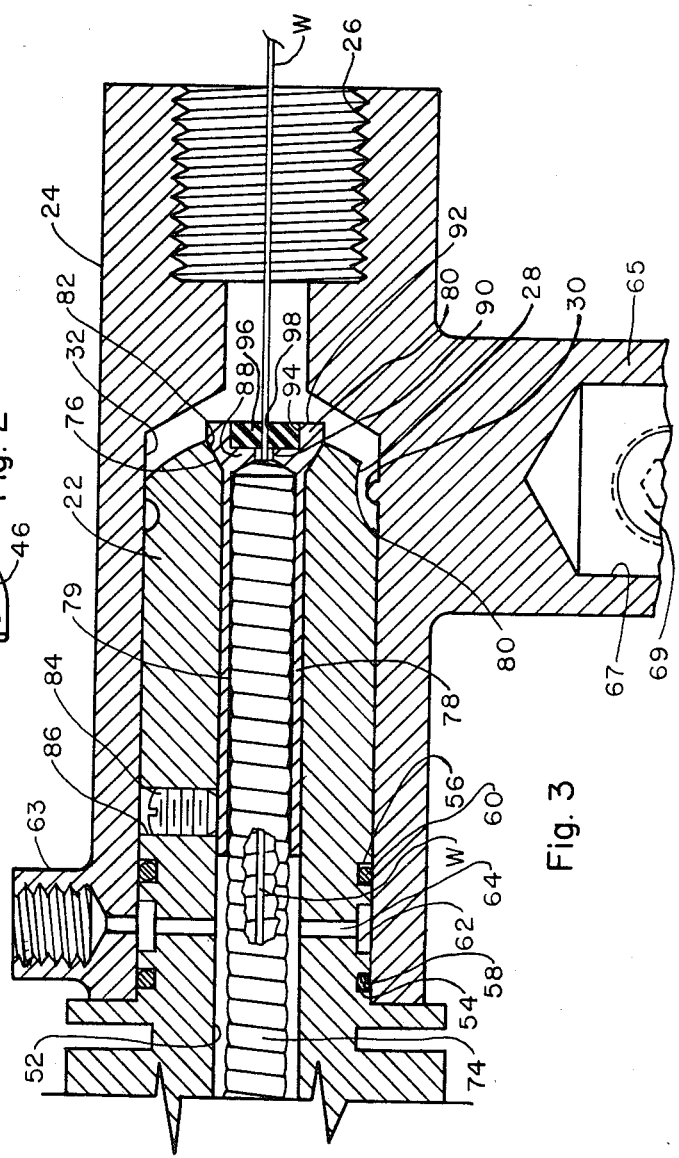
FIG. 3 is a further enlarged cross-sectional view taken on line 3—3 of FIG. 4 showing the electric inlet connection offset for clarity.

The structural details of the cable assembly 18 are shown in FIG. 2 and include a flexible rubber or rubber-like tubular innercore 66 which is surrounded by the layer 68 of woven conductive material such as copper which has one end connected to the one end of the quick connect/disconnect coupling member 22 and which is in electrical connection to the adapter 24. The layer 68 extends the length of the cable 18 and provides the main power connection for the device. The cable assembly 18 also houses the two leads 48 and 50 that extend from a trigger controlled switch (not shown) in the handle portion 16 to and through the connector assembly 20. The cable 18 also has an outer non-conductive cover 70 which extends the length thereof.

The inner tubular cable core 66 has a bore 72 which extends the length of the cable 18 and communicates at one end with the gun tube 12 and at the opposite end with the bore 52 through the coupling 22. A liner member 74 is positioned within the bore 72 and extends substantially the length thereof. The welding wire "W" moves through the liner member 74 as it travels from the source of welding wire to the welding location where it is consumed. The liner 74 is shown as being a wire wound member but can also be a plastic or plastic-like member and has one end extending into the coupling 22.

One of the problems with known welding gun assemblies, including assemblies of the type referred to in the above referenced Colman U.S. Pat. No. 4,403,136 is that the shielding gas, which is fed into the system under pressure through the radial orifices 64 from near the rear of the system, must travel the length of the system. Therefore, if there is any leakage especially near the rear of the assembly the gas will seek the course of least resistance and leak out the rear end of the cable. Such leakage is wasteful and expensive and also reduces the gas pressure at the nozzle end of the assembly where the gas is needed. This results in considerable waste and inefficiency. The usual shielding gases that are used in MIG guns and the like include carbon dioxide, argon, helium and mixtures thereof. Such gases are relatively expensive and if substantial leakage occurs as is true of most known MIG gun devices, this substantially increases the cost of operation and can greatly reduce the operating efficiency. This is especially disadvantageous as the cost of the gas increases as with gases such as argon and helium. The present invention resides in means to substantially reduce or eliminate altogether the leakage of shielding gas introduced into MIG gun systems such as that described, and particularly the leakage of shielding gas out through the rear end of the system at the connector assembly 20 and through the power adapter 24 attached thereto.

Referring to FIG. 3, it can be seen that the quick connect/disconnect coupling 22 has the axial bore 52 extending therethrough from one end to the other. The inlet end of the coupling 22, which is the end through which welding wire "W" is introduced, has a frusto-conical shaped surface 76 formed thereon the purpose for which will be explained later. The bore 52 in the quick connect/disconnect coupling 22 receives an elongated tubular member 78 the construction of which is very important to the present invention. One end of wire wound liner 74 is positioned extending into tubular member 78 and is preferably retained therein as by cementing, gluing, soldering, swaging or otherwise attaching the members including also by sweat fitting or otherwise forcing the members into engagement. In this way the liner 74 and the tubular member 78 become an integral replaceable assembly. Although it is not necessary to permanently attach the liner 74 within tubular member 78 it is preferred to do so to maintain a tight sealed connection therebetween. In FIG. 3 one end of the liner 74 is shown retained in tubular member 78 by adhesive or solder 79.

The construction of tubular member 78 is important to the present invention. The tubular member 78 is positioned extending into the bore 52 to the position shown in FIG. 3 and preferably makes a relatively tight fitting connection therewith. The liner member 74 with the member 78 attached is installed by introducing it into the bore 52 and feeding it through the passage 72 in the cable 18 to the gun tube 12 until the tubular member 78 is positioned in the bore 52 and is fully seated therein. The upstream end of the tubular member 78 is flanged and includes an outwardly extending annular flange portion 80 which has a frusto-conical shaped tapered surface 82 which is machined or otherwise formed thereon to mate precisely with the frusto-conical shaped surface 76 on the end of the quick connect/disconnect coupling 22 to form a seal therebetween when the tubular member 78 is in its fully seated position. When so positioned the tubular member 78 is retained in position by tightening a set screw 84 thereagainst, which set screw is located in a threaded bore 86 which communicates with the bore 52.

The tubular member 78 also has an inwardly extending flange 88 which defines a wire guide opening or orifice 90 therethrough, through which the welding wire "W" passes as it enters the liner member 74 and is fed therethrough to and through the nozzle 14. The inwardly extending flange 88 is shown spaced from or recessed from end surface 92 of the tubular member 78 so as to form a cavity, shown as round cavity 94, on the upstream side of the flange 88 where the welding wire "W" enters the orifice 90. The round cavity 94 receives a resilient gasket member 96 which has an orifice 98 therethrough that is sized to be slightly smaller in diameter than the diameter of the welding wire "W" so that as the welding wire moves through the orifice 98, it will be rubbed on all sides with the gasket member 96 and in so doing will form a continuous seal therewith to prevent the escape of shielding gas thereby. The resilient gasket member 96 can be constructed of a number of different resilient materials including plastic, felt, rubber or rubber-like materials. As the welding wire moves through the orifice 98 in the gasket member 96 it may produce some slight amount of rubbing because of its movement. However, the welding wire moves relatively slowly therethrough and the wear produced on the gasket will therefore be minimal. By having the gasket member 96 on the upstream side of the orifice 90 formed by the inwardly extending flange 88, the gasket member 96 is positively supported at all times over most of its surface and is maintained in tight fitting engagement in the cavity 94 in which it is positioned. This is important to the operation of the present device since most of the gas leakage that normally occurs occurs around where the welding wire "W" passes through the orifice 90. In the past no effort was made to maintain a sealed condition between a member such as the gasket member 96 and the welding wire "W" as in the present construction.

The gasket member 96 may be adhesively attached within cavity 94 as by cement, glue, or other captivating means. In prior constructions where the wire engaging member is located downstream of the entrance orifice there is much greater leakage of welding gas around the outer edge of the wire engaging member as well as through the passage therethrough through which the wire extends. The present construction, with an upstream supported resilient wire engaging member, represents a much more effective means for reducing shielding gas leakage in MIG-type guns. This type of seal is an important distinguishing feature of the present device and one which substantially reduces the cost of operating MIG type gun welding systems.

With the present construction, when the orifice 98 through the gasket member 96 begins to show wear so that some leakage may occur it is a relatively simple matter to replace the resilient gasket member 96. This can be accomplished by removing the worn resilient gasket member 96 and replacing it. This may involve cementing the new resilient gasket member in the cavity 94. It is also a relatively simple procedure to replace the liner member 74 and the tubular member 78 which is attached thereto including the resilient gasket member 96 by sliding the old liner out and inserting the new one. Such a replacement can be done to compensate for wear and it can also be done to change from welding with one size welding wire to welding with another size welding wire. The labor required to make such replacements, and the cost of the parts replaced is relatively small yet the saving achieved thereby in the reduction of the leakage of shielding gas can be very substantial.

Thus, there has been shown and described novel means for reducing or completely eliminating the undesireable escape of shielding gas from a welding device such as a MIG gun welding device, which means fulfill all of the object and advantages sought therefor. It will be apparent to those skilled in the art, however, that many changes, variations, modifications, and other uses and applications of the subject device are possible, and all such changes, modifications, variations and other uses and applications which do not depart from the spirit and scope of the invention are deemed to be covered by the invention which is limited only by the claims which follow.

What is claimed is:

1. Means to prevent the escape of gas from the inlet end of a wire feed connector assembly through which welding wire passes from a wire feed unit to a welding location comprising an inlet connector assembly having a bore with an inlet end adapted to communicate with a supply of welding wire, means positioned in said bore through which the welding wire passes from the feed unit including an elongated tubular member having inlet and outlet ends and sized to extend into the inlet end of said bore, said tubular member having an upstream end defined by an inwardly extending flange having an opening therethrough sized to receive and guide welding wire as it passes therethrough, and a seal member mounted on the tubular member on the upstream side of the inwardly extending flange, said seal member including a resilient member having an orifice therethrough positioned to register with the opening defined by the inwardly extending flange, the opening in the resilient member being sized to resiliently engage the welding wire passing therethrough.

2. The means of claim 1 wherein the upstream end of the tubular member includes an outwardly extending annular flange having a surface thereon adapted to be placed in substantially surface-to-surface contact with the inlet connector assembly adjacent said inlet end of the bore therethrough to form a seal therebetween.

3. The means of claim 2 wherein the inlet end of the bore in the connector assembly includes an outwardly extending frusto conical shaped surface, the outwardly extending annular flange on the tubular member having a frusto conical surface adapted to be positioned in surface-to-surface contact with the frusto conical shaped surface on the connector assembly to form a seal therebetween when the tubular member is seated in the bore.

4. In a welding gun assembly having a welding gun tube, a connector assembly and a flexible cable assembly extending substantially between the welding gun tube and the connector assembly for communication therebetween, the connector assembly having means associated therewith for connection to a power adapter which has a source of welding wire associated therewith for feeding the welding wire to the gun tube through the connector assembly and the cable assembly, the cable assembly including a tubular wall portion having an electrically conductive portion and a passageway therethrough and means including a flexible liner extending through the passageway in the cable assembly through which the welding wire passes as it moves from the connector assembly to the welding gun tube, the flexible liner having a first end extending to adjacent the welding gun tube and an opposite end, and means forming a bore through the connector assembly in position to receive the opposite end of said flexible liner, the improvement comprising an elongated tubular member having an inside diameter sized to receive the opposite end of the flexible liner, an outside diameter sized to be positioned extending into the bore of the connector assembly and flange means on one end of said elongated tubular member including an outwardly extending annular flange having a surface adapted to be in substantially surface-to-surface contact with the connector assembly adjacent the bore therethrough to form a seal therebetween, and an inwardly extending flange defining an opening of a size to permit the welding wire to be guided therethrough, said inwardly extending flange and the adjacent portion of the tubular member forming a cavity on the upstream side of the inwardly extending flange, and a relatively resilient member positioned in said cavity upstream of the opening for the welding wire, said resilient member having an opening therethrough in position to register with the opening defined by the inwardly extending flange, said opening in the resilient member when unstressed, having a size to resiliently engage the welding wire when the welding wire is positioned extending therethrough.

5. In the welding gun assembly of claim 4 wherein said cavity and said resilient member are round.

6. In the welding gun assembly of claim 4 wherein the flexible liner member is formed of closely wound wire loops.

7. In the welding gun assembly of claim 4 wherein the flexible liner member is constructed of plastic.

8. In the welding gun assembly of claim 4 wherein the connector assembly includes a threaded opening which communicates with the bore therethough at the location where the tubular member is mounted, and a set screw positioned in said threaded opening and adjustable therein to bear against the elongated tubular member to lock said member in position in the bore.

9. In the welding gun assembly of claim 4 wherein the inwardly and outwardly extending flanges form the cavity for the resilient member.

10. In the welding gun assembly of claim 4 means are provided to fixedly connect the opposite end of the flexible liner in the tubular member.

11. In a welding gun assembly including a welding gun tube, a wire feed unit and a flexible cable extending from adjacent to the gun tube to the wire feed unit, the wire feed unit including a connector having a bore therethrough terminating in a frusto conical surface on the connector through which welding wire is fed from the wire feed unit to and through the cable to the welding gun tube, the cable including a flexible outer portion having first and second ends and a passageway extending therebetween and means including a flexible liner extending through the passageway in the cable through which welding wire passes, the flexible liner having a first end extending to adjacent the welding gun tube and an opposite end, the improvement comprising a wire guide member for mounting in the bore of the connector for guiding welding wire fed from the wire feed unit into the passageway in the cable, said wire guide member including an elongated tubular member having an inside diameter sized to receive the opposite end of the flexible liner, an outside diameter sized to be slideably positioned extending into the bore of the connector, flange means on one end of said elongated member including an outwardly extending annular flange having a frusto conical shaped surface adapted to be positioned in surface-to-surface contact with the frusto conical shaped surface on the connector to form a seal therebetween, an inwardly extending flange adjacent the said one end of the wire guide member defining an opening of a size to receive and guide the welding wire as it moves therethrough, said inwardly extending flange having an upstream side where the welding wire enters said opening, a cavity adjacent the upstream side of the opening, a resilient member positioned in said cavity, said resilient member having an opening therethrough in position to register with the opening defined by the inwardly extending flange, the opening in the resilient member being of a size to resiliently engage the welding wire when the welding wire is positioned extending therethrough to form a seal therebetween.

12. In the welding gun assembly of claim 11 wherein said resilient member and said cavity are round.

13. In the welding gun assembly of claim 11 wherein the flexible liner is formed of closely wound wire loops, said flexible liner extending through the flexible cable and having the opposite end thereof adapted to extend into the tubular member to adjacent the inwardly extending flange thereon.

14. In the welding gun assembly of claim 11 wherein the flexible liner is constructed of plastic material, said liner extending through the flexible cable and having the opposite end thereof adapted to extend into the tubular member to adjacent the inwardly extending flange thereon.

15. In the welding gun assembly of claim 11 wherein the connector assembly includes a threaded opening which communicates at one end with the bore therethrough at the location in the bore into which the tubular member extends and a threaded member positioned in said threaded opening and adjustable therein to bear against the elongated tubular member to lock said tubular member in position in the bore.

16. In the welding gun assembly of claim 11 wherein the inwardly and outwardly extending flanges form the cavity for the resilient member.

17. In the welding gun assembly of claim 11 wherein means are provided to fixedly connect the opposite end of the flexible liner in the tubular member.

* * * * *